US008576550B2

(12) United States Patent
Huang et al.

(10) Patent No.: US 8,576,550 B2
(45) Date of Patent: Nov. 5, 2013

(54) KEYBOARD FIXING STRUCTURE FOR FIXING A KEYBOARD AND PORTABLE ELECTRONIC DEVICE THEREWITH

(75) Inventors: Yu-Hsien Huang, New Taipei (TW); Chi-Chun Chiang, New Taipei (TW); Chih-Hao Chen, New Taipei (TW); Chia-Hsiung Hsueh, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 196 days.

(21) Appl. No.: 13/343,722

(22) Filed: Jan. 5, 2012

(65) Prior Publication Data
US 2013/0010417 A1   Jan. 10, 2013

(30) Foreign Application Priority Data
Jul. 6, 2011  (TW) .............................. 100123830 A

(51) Int. Cl.
*G06F 1/16* (2006.01)
(52) U.S. Cl.
USPC ............. 361/679.17; 361/679.09; 248/222.12
(58) Field of Classification Search
USPC ................... 361/679.09, 679.17; 248/222.12
See application file for complete search history.

(56) References Cited

U.S. PATENT DOCUMENTS

| | | | | |
|---|---|---|---|---|
| 5,966,284 A * | 10/1999 | Youn et al. | | 361/679.17 |
| 6,212,066 B1 * | 4/2001 | Fetterman | | 361/679.17 |
| 6,493,215 B1 * | 12/2002 | Chiang et al. | | 361/679.09 |
| 6,648,231 B1 * | 11/2003 | Chuang | | 361/679.17 |
| 7,265,969 B2 * | 9/2007 | Jin | | 361/679.09 |
| 7,382,604 B2 * | 6/2008 | Minaguchi et al. | | 361/679.09 |
| 7,385,808 B2 * | 6/2008 | Hamada et al. | | 361/679.09 |
| 7,450,370 B2 * | 11/2008 | Jiang et al. | | 361/679.09 |
| 7,643,278 B2 * | 1/2010 | Hou | | 361/679.17 |
| 8,422,211 B2 * | 4/2013 | Lee et al. | | 361/679.17 |
| 2004/0027795 A1 * | 2/2004 | Lee et al. | | 361/683 |
| 2007/0201194 A1 * | 8/2007 | Chen et al. | | 361/680 |
| 2009/0279238 A1 * | 11/2009 | Kobayashi et al. | | 361/679.09 |
| 2010/0039761 A1 * | 2/2010 | Wang | | 361/679.17 |
| 2010/0271771 A1 * | 10/2010 | Wu et al. | | 361/679.17 |
| 2011/0165843 A1 * | 7/2011 | Wang | | 455/41.3 |
| 2011/0182016 A1 * | 7/2011 | Chen et al. | | 361/679.09 |
| 2011/0235275 A1 * | 9/2011 | Su et al. | | 361/679.01 |
| 2012/0039033 A1 * | 2/2012 | Lee et al. | | 361/679.17 |

FOREIGN PATENT DOCUMENTS

TW        M291568        6/2006

* cited by examiner

*Primary Examiner* — Lisa Lea Edmonds
(74) *Attorney, Agent, or Firm* — Winston Hsu; Scott Margo

(57) ABSTRACT

A keyboard fixing structure for fixing a keyboard in an opening of a housing is disclosed. The keyboard fixing structure includes an engaging portion, a first fixing portion, a first flexible connecting portion, a second fixing portion and a second flexible connecting portion. The engaging portion presses a first side of the keyboard in the opening. The first fixing portion is fixed on the housing, and the first flexible connecting portion is connected to the first fixing portion and the engaging portion. The second fixing portion is fixed on the housing, and the second flexible connecting portion is connected to the second fixing portion and the engaging portion. The first flexible connecting portion and the second flexible connecting portion cooperatively provide resilient force to the engaging portion in a first direction for driving the engaging portion to press the first side of the keyboard.

13 Claims, 4 Drawing Sheets

KEYBOARD FIXING STRUCTURE FOR FIXING A KEYBOARD AND PORTABLE ELECTRONIC DEVICE THEREWITH

BACKGROUND OF THE INVENTION

1. Field of the Invention

The present invention relates to a keyboard fixing structure and a portable electronic device therewith, and more particularly, to a keyboard fixing structure for fixing a keyboard without using screw components and a portable electronic device therewith.

2. Description of the Prior Art

Generally speaking, when installing a keyboard onto a notebook computer, screw components and corresponding keyboard fixing structures, such as screw bosses, screw holes and so on are used for fixing the keyboard onto the notebook computer. Thus, manufacture of the notebook computer in the factory with the above-mentioned manner needs a screwing process. Accordingly, it takes more labor hour so as to increase manufacturing cost. Furthermore, the notebook computer needs to be disassembled for solving some issues found during certain tests required on the production line. Consequently, the screws need to be taken off first and then the keyboard can be detached from the notebook computer, so as to make an operator get inside the notebook computer for solving the issues. As a result, the conventional keyboard fixing structures will take more labor hour not only in manufacturing process but also in fixing process, so as to greatly increase the manufacturing cost.

SUMMARY OF THE INVENTION

Thus, the present invention provides a keyboard fixing structure for fixing a keyboard without using screw components and a portable electronic device therewith for solving above drawbacks.

According to the claimed invention, a keyboard fixing structure for fixing a keyboard in an opening of a housing includes an engaging portion for pressing a first side of the keyboard in the opening; a first fixing portion fixed on the housing; a first flexible connecting portion connected to the first fixing portion and the engaging portion; a second fixing portion fixed on the housing; and a second flexible connecting portion connected to the second fixing portion and the engaging portion, the first flexible connecting portion and the second flexible connecting portion cooperatively providing resilient force to the engaging portion in a first direction for driving the engaging portion to press the first side of the keyboard.

According to the claimed invention, the engaging portion separates from the first side of the keyboard when both of the first flexible connecting portion and the second flexible connecting portion elastically deform in a second direction opposite to the first direction.

According to the claimed invention, a guiding structure is formed on a side of the engaging portion for guiding the first side of the keyboard to insert into the opening.

According to the claimed invention, the first fixing portion and the second fixing portion are respectively fixed on the housing in a hot-melting manner or in a screwing manner.

According to the claimed invention, a bending direction of the first flexible connecting portion is substantially identical to a bending direction of the second flexible connecting portion.

According to the claimed invention, a portable electronic device includes a housing whereon an opening is formed; a keyboard detachably disposed in the opening; and a keyboard fixing structure for fixing the keyboard in the opening on the housing including an engaging portion for pressing a first side of the keyboard in the opening; a first fixing portion fixed on the housing; a first flexible connecting portion connected to the first fixing portion and the engaging portion; a second fixing portion fixed on the housing; and a second flexible connecting portion connected to the second fixing portion and the engaging portion, the first flexible connecting portion and the second flexible connecting portion cooperatively providing resilient force to the engaging portion in a first direction for driving the engaging portion to press the first side of the keyboard.

According to the claimed invention, the keyboard further includes a first engaging structure disposed on the first side for engaging the engaging portion.

According to the claimed invention, the keyboard further includes a second engaging structure disposed on a second side opposite to the first side, the housing comprises a third engaging structure disposed in the opening and located in a position corresponding to the second engaging structure, and the third engaging structure is used for engaging the second engaging structure.

According to the claimed invention, the housing further includes a recess portion formed nearby the opening.

In summary, when the keyboard fixing structure is installed onto the housing of the portable electronic device, such as a notebook computer, the first flexible connecting portion and the second flexible connecting portion of the keyboard fixing structure of the present invention can cooperatively provide the resilient force to the engaging portion in the first direction for driving the engaging portion to press the first side of the keyboard. Furthermore, when it is desired to detach the keyboard from the housing of the portable electronic device, the first flexible connecting portion and the second flexible connecting portion can be elastically deformed in the direction opposite to the first direction for driving the engaging portion to separate from the first side of the keyboard. Accordingly, the keyboard can be detached from the housing of the portable electronic device. In such a manner, there is no need to utilize an additional screwing component, such as a screw, for fixing the keyboard onto the portable electronic device with the keyboard fixing structure of the present invention. As a result, the keyboard fixing structure of the present invention can save labor hour not only in manufacturing process but also in fixing process, so as to greatly decrease the manufacturing cost.

These and other objectives of the present invention will no doubt become obvious to those of ordinary skill in the art after reading the following detailed description of the embodiment that is illustrated in the various figures and drawings.

DETAILED DESCRIPTION

Figure 1:
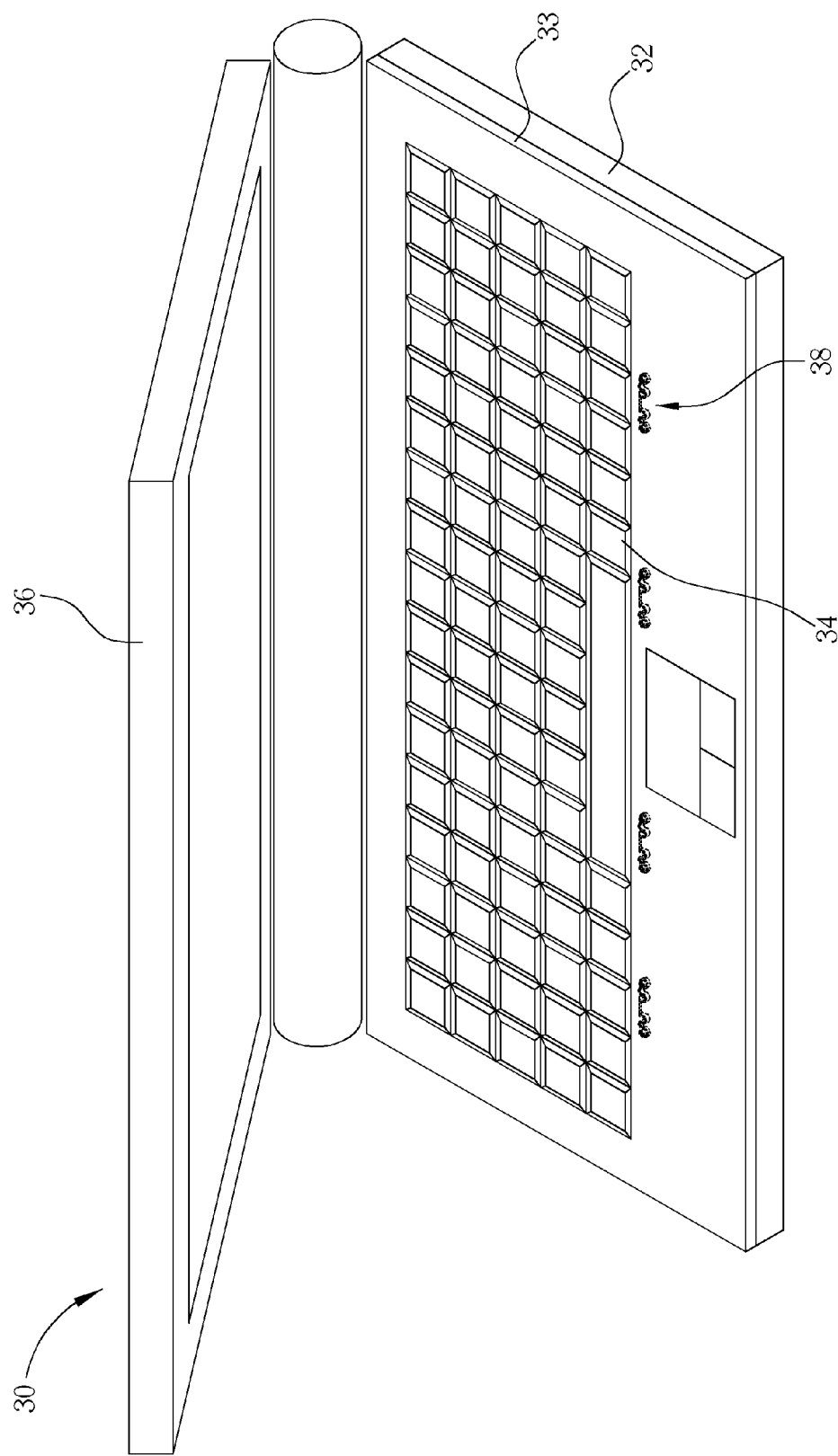
FIG. 1 is a diagram of a portable electronic device according to an embodiment of the present invention.

Please refer to FIG. 1. FIG. 1 is a diagram of a portable electronic device 30 according to an embodiment of the present invention. As shown in FIG. 1, the portable electronic device 30 includes a housing 32, an upper cover 33, a keyboard 34, a display module 36 and at least one keyboard fixing structure 38. The upper cover 33 is installed on the housing 32 for covering internal components of the portable electronic device 30 cooperatively with the housing 32, so as to protect the internal components. The keyboard 34 is detachably disposed on the housing 32, and each of key switches on the keyboard 34 is exposed from the upper cover 33 for performing corresponding functions by a user. The display module 36 is pivoted to the housing 32, and the display module 36 is for displaying information. The keyboard fixing structure 38 is disposed on the housing 32 for fixing the keyboard 34 onto the housing 32. In this embodiment, the portable electronic device 30 can be a notebook computer, the keyboard 34 can be a keyboard module of the notebook computer, and the display module 36 can be a liquid crystal display panel module of the notebook computer.

Figure 2:
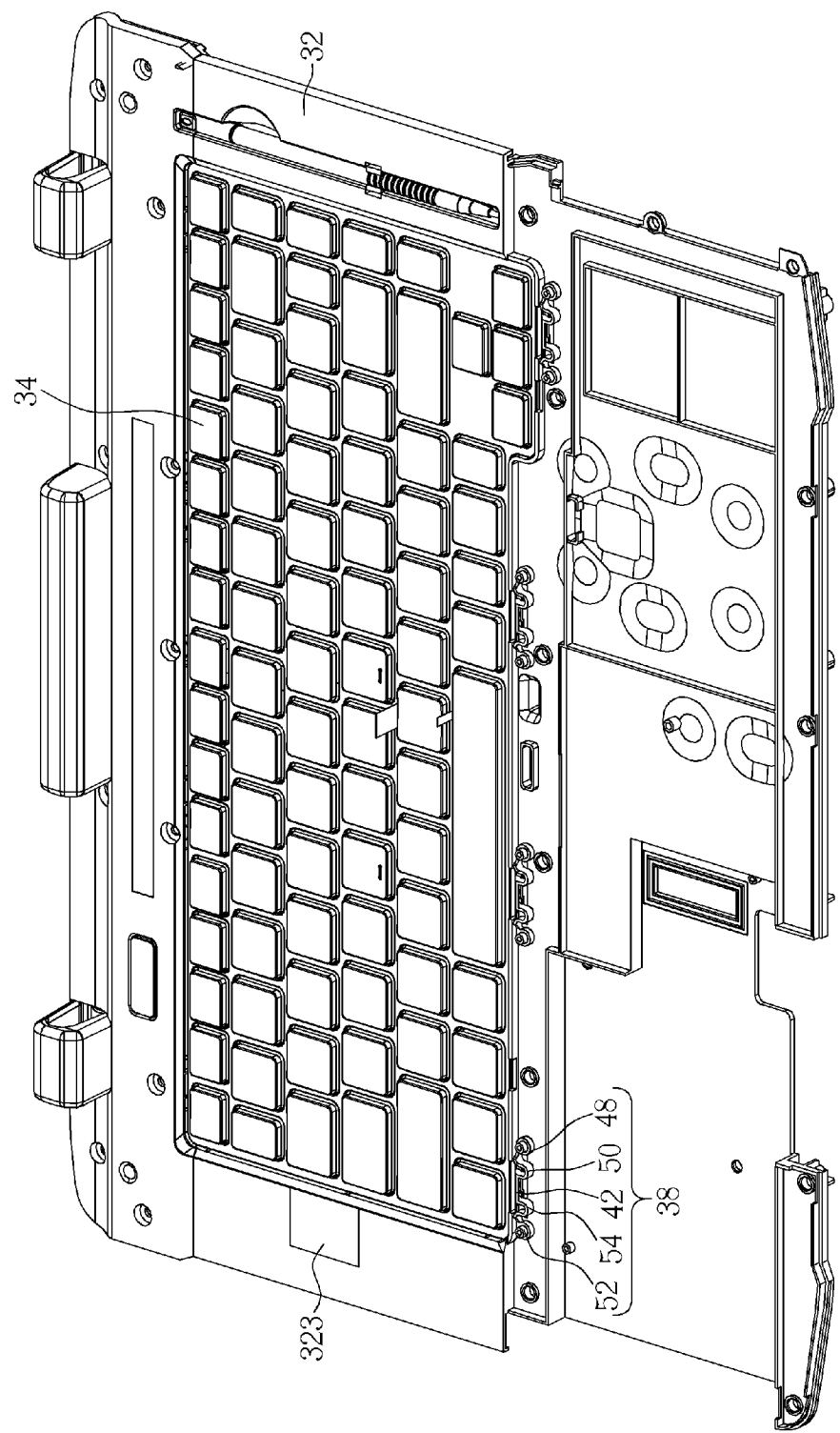
FIG. 2 is an assembly diagram of a housing, a keyboard and a keyboard fixing structure according to the embodiment of the present invention.
Figure 3:
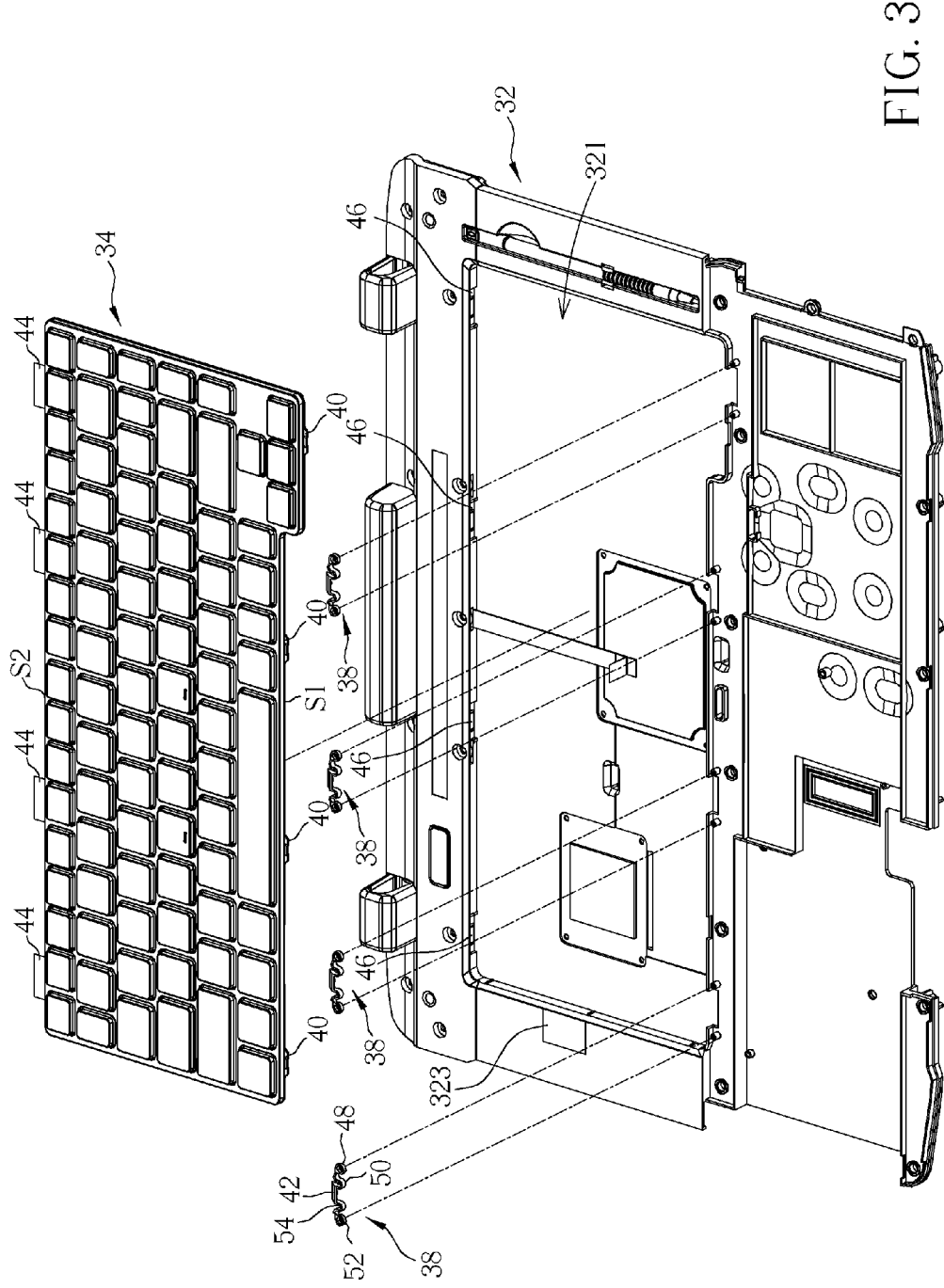
FIG. 3 is an exploded diagram of the housing, the keyboard and the keyboard fixing structure according to the embodiment of the present invention.
Figure 4:
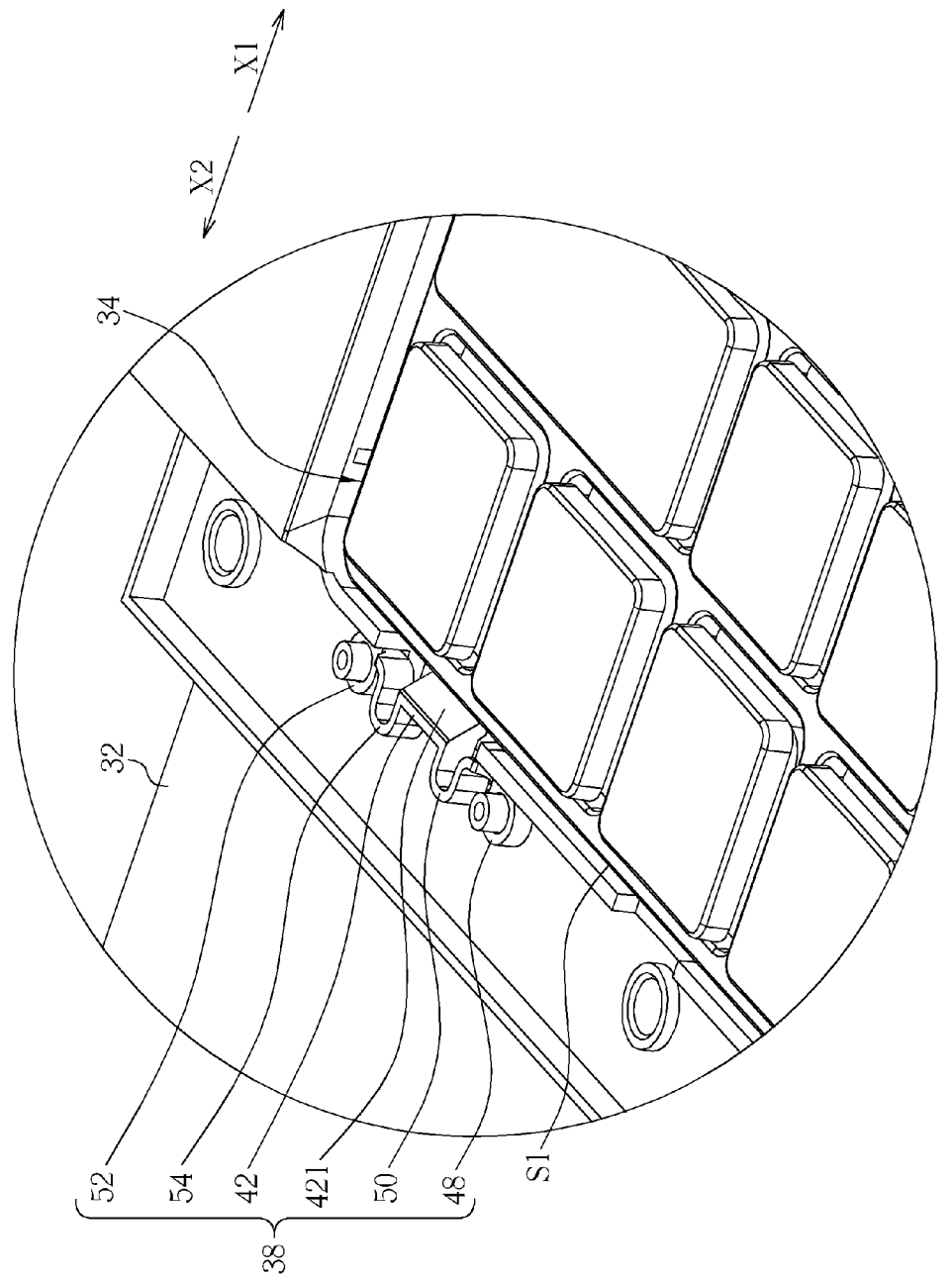
FIG. 4 is a partially enlarged diagram of the housing, the keyboard and the keyboard fixing structure from another view angle according to the embodiment of the present invention.

Please refer to FIG. 2 to FIG. 4. FIG. 2 is an assembly diagram of the housing 32, the keyboard 34 and the keyboard fixing structure 38 according to the embodiment of the present invention. FIG. 3 is an exploded diagram of the housing 32, the keyboard 34 and the keyboard fixing structure 38 according to the embodiment of the present invention. FIG. 4 is a partially enlarged diagram of the housing 32, the keyboard 34 and the keyboard fixing structure 38 from another view angle according to the embodiment of the present invention. As shown in FIG. 2 to FIG. 4, an opening 321 is formed on the housing 32, and the keyboard 34 is detachably disposed in the opening 321. The keyboard fixing structure 38 is used for fixing the keyboard 34 in the opening 321 on the housing 32, so as to preventing the keyboard 34 from separating from the opening 321. In this embodiment, there are four keyboard fixing structures 38 disposed on a lower side of the opening 321. Amount and disposal of the keyboard fixing structure 38 are not limited to those mentioned in this embodiment, and it depends on practical demands. Furthermore, the keyboard 34 has a first side S1 and a second side S2. The keyboard 34 can further include at least one first engaging structure 40 disposed on the first side S1 of the keyboard 34.

Furthermore, each of the keyboard fixing structure 38 includes an engaging portion 42, and each of the engaging portion 42 corresponds to the first engaging structure 40 on the first side S1 of the keyboard 34 for pressing the first side S1 of the keyboard 34 in the opening 321. In addition, a guiding structure 421 is formed on a side of the engaging portion 42 for guiding the first engaging structure 40 of the keyboard 34 to insert into the opening 321 when the keyboard 34 presses the engaging portion 42. In other words, by guidance of the guiding structure 421, the first side S1 of the keyboard 34 is capable of inserting into the opening 321 more easily. In addition, the keyboard 34 further includes at least one second engaging structure 44, and the housing 32 further includes at least one third engaging structure 46. The second engaging structure 44 is disposed on the second side S2, and the third engaging structure 46 is disposed around the opening 321 and located in a position corresponding to the second engaging structure 44. Accordingly, the third engaging structure 46 of the housing 32 is used for engaging the second engaging structure 44 of the keyboard 34. In such a manner, the third engaging structure 46 of the housing 32 can fix the keyboard 34 in the opening 321 cooperatively with the engaging portion 42 of the keyboard fixing structure 38, so as to prevent the keyboard 34 from separating from the opening 321.

In this embodiment, the first side S1 is opposite to the second side S2. In other words, the engaging portion 42 of the keyboard fixing structure 38 and the third engaging structure 46 of the housing 32 are engaged with the first engaging structure 40 and the second engaging structure 44 on the opposite sides of the keyboard 34, respectively. In such a manner, the keyboard 34 can be fixed in the opening 321 on the housing 32 more firmly. It should be noticed that disposal positions of the engaging portion 42 of the keyboard fixing structure 38 and the third engaging structure 46 of the housing 32 are not limited to those mentioned above. For example, the first side S1 can be adjacent to the second side S2 instead. In other words, the engaging portion 42 of the keyboard fixing structure 38 and the third engaging structure 46 of the housing 32 can be engaged with the first engaging structure 40 and the second engaging structure 44 on the adjacent sides of the keyboard 34, respectively. That is, the disposal positions of the engaging portion 42 and the third engaging structure 46 capable of fixing the keyboard 34 in the opening 321 on the housing 32 are within the scope of the present invention.

In addition, each of the keyboard fixing structure 38 further includes a first fixing portion 48, a first flexible connecting portion 50, a second fixing portion 52 and a second flexible connecting portion 54. The first fixing portion 48 is fixed on the housing 32, and the first flexible connecting portion 50 is connected to the first fixing portion 48 and the second engaging structure 44. Similarly, the second fixing portion 52 is fixed on the housing 32, and the second flexible connecting portion 54 is connected to the second fixing portion 52 and the engaging portion 42. In other words, an end of the engaging portion 42 of the keyboard fixing structure 38 is connected to the housing 32 of the portable electronic device 30 via the first fixing portion 48 and the first flexible connecting portion 50, and another end of the engaging portion 42 of the keyboard fixing structure 38 is connected to the housing 32 of the portable electronic device 30 via the second fixing portion 52 and the second flexible connecting portion 54. In this embodiment, the first fixing portion 48 and the second fixing portion 52 of the keyboard fixing structure 38 can be, but not limited to, fixed on the housing 32 in a hot-melting manner, respectively. For example, the first fixing portion 48 and the second fixing portion 52 of the keyboard fixing structure 38 can be respectively fixed on the housing 32 in a screwing manner in another embodiment. In other words, structures capable of fixing the first fixing portion 48 and the second fixing portion 52 onto the housing 32 are within the scope of the present invention.

More detailed description for assembly of the keyboard fixing structure 38 is provided as follows. Please refer to FIG. 3 and FIG. 4. At first, the second engaging structure 44 on the second side S2 of the keyboard 34 can be slantwise pushed into the third engaging structure 46 around the opening 321 on the housing 32, and the second side S2 of the keyboard 34 can be fixed in the opening 321 by engagement of the second engaging structure 44 and the third engaging structure 46. Then, the first side S1 of the keyboard 34 is pressed onto the keyboard fixing structure 38, and the first engaging structure 40 on the first side S1 of the keyboard 34 slides relatively to the guiding structure 421 of the engaging portion 42 by the guidance of the guiding structure 421 of the engaging portion 42. In the meanwhile, the engaging portion 42 is pushed in a second direction X2 until the first engaging structure 40 is pushed to a position beneath the engaging portion 42 of the keyboard fixing structure 38. In the meanwhile, the second flexible connecting portion 54 and the second fixing portion 52 of the keyboard fixing structure 38 can cooperatively provide the engaging portion 42 with a resiliently force in a first direction X1 opposite to the second direction X2, so as to drive the engaging portion 42 to press the first side S1 of the keyboard 34. In such a manner, the engaging portion 42 can fix the first side S1 of the keyboard 34 in the opening 321. It should be noticed that, in this embodiment, a bending direction of the first flexible connecting portion 50 can be substantially identical to a bending direction of the second flexible connecting portion 54, so as to symmetrically provide the resilient force to the engaging portion 42 in the first direction X1. Accordingly, the engaging portion 42 can press and fix the first side S1 of the keyboard 34 more firmly and stably.

When it is desired to detach the keyboard 34 from the opening 321 on the housing 32, at first, the engaging portion 42 of the keyboard fixing structure 38 can be pushed in the second direction X2, such that the first flexible connecting portion 50 and the second flexible connecting portion 54 deform in the second direction X2. In the meanwhile, the engaging portion 42 can be separated from the first side S1 of the keyboard 34. Accordingly, the first side S1 of the keyboard 34 can be detached upwardly from the opening 321 on the housing 32. Then, the keyboard 34 is continuously pulled in the second direction X2 so as to separate the second engaging structure 44 on the second side S2 of the keyboard 34 from the third engaging structure 46 of the housing 32. In such a manner, the keyboard 34 can be detached from the opening 321 on the housing 32. It should be noticed that, in this embodiment, the housing 32 can further include a recess portion 323 formed nearby the opening 321, as shown in FIG. 2 and FIG. 3. The recess portion 323 allows a user's finger to take the side of the keyboard 34 when the keyboard 34 is detached from the opening 321 on the housing 32.

Compared with the prior art, when the keyboard fixing structure is installed onto the housing of the portable electronic device, such as a notebook computer, the first flexible connecting portion and the second flexible connecting portion of the keyboard fixing structure of the present invention can cooperatively provide the resilient force to the engaging portion in the first direction for driving the engaging portion to press the first side of the keyboard. Furthermore, when it is desired to detach the keyboard from the housing of the portable electronic device, the first flexible connecting portion and the second flexible connecting portion can be elastically deformed in the direction opposite to the first direction for driving the engaging portion to separate from the first side of the keyboard. Accordingly, the keyboard can be detached from the housing of the portable electronic device. In such a manner, there is no need to utilize an additional screwing component, such as a screw, for fixing the keyboard onto the portable electronic device with the keyboard fixing structure of the present invention. As a result, the keyboard fixing structure of the present invention can save labor hour not only in manufacturing process but also in fixing process, so as to greatly decrease the manufacturing cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyboard fixing structure for fixing a keyboard in an opening of a housing, comprising:
   an engaging portion for pressing a first side of the keyboard in the opening;
   a first fixing portion fixed on the housing;
   a first flexible connecting portion connected to the first fixing portion and the engaging portion;
   a second fixing portion fixed on the housing; and
   a second flexible connecting portion connected to the second fixing portion and the engaging portion, the first flexible connecting portion and the second flexible connecting portion cooperatively providing resilient force to the engaging portion in a first direction for driving the engaging portion to press the first side of the keyboard.

2. The keyboard fixing structure of claim 1, wherein the engaging portion separates from the first side of the keyboard when both of the first flexible connecting portion and the second flexible connecting portion elastically deform in a second direction opposite to the first direction.

3. The keyboard fixing structure of claim 1, wherein a guiding structure is formed on a side of the engaging portion for guiding the first side of the keyboard to insert into the opening.

4. The keyboard fixing structure of claim 1, wherein the first fixing portion and the second fixing portion are respectively fixed on the housing in a hot-melting manner or in a screwing manner.

5. The keyboard fixing structure of claim 1, wherein a bending direction of the first flexible connecting portion is substantially identical to a bending direction of the second flexible connecting portion.

6. A portable electronic device, comprising:
   a housing whereon an opening is formed;
   a keyboard detachably disposed in the opening; and
   a keyboard fixing structure for fixing the keyboard in the opening on the housing, comprising:
      an engaging portion for pressing a first side of the keyboard in the opening;
      a first fixing portion fixed on the housing;
      a first flexible connecting portion connected to the first fixing portion and the engaging portion;
      a second fixing portion fixed on the housing; and
      a second flexible connecting portion connected to the second fixing portion and the engaging portion, the first flexible connecting portion and the second flexible connecting portion cooperatively providing resilient force to the engaging portion in a first direction for driving the engaging portion to press the first side of the keyboard.

7. The portable electronic device of claim 6, wherein the engaging portion separates from the first side of the keyboard when both of the first flexible connecting portion and the second flexible connecting portion elastically deform in a second direction opposite to the first direction.

8. The portable electronic device of claim 6, wherein the keyboard further comprises:
   a first engaging structure disposed on the first side for engaging the engaging portion.

9. The portable electronic device of claim 8, wherein a guiding structure is formed on a side of the engaging portion for guiding the first engaging structure of the keyboard to insert into the opening.

10. The portable electronic device of claim 8, wherein the keyboard further comprises a second engaging structure disposed on a second side opposite to the first side, the housing comprises a third engaging structure disposed in the opening and located in a position corresponding to the second engaging structure, and the third engaging structure is used for engaging the second engaging structure.

11. The portable electronic device of claim 6, wherein the first fixing portion and the second fixing portion are respectively fixed on the housing in a hot-melting manner or in a screwing manner.

12. The portable electronic device of claim 6, wherein a bending direction of the first flexible connecting portion is substantially identical to a bending direction of the second flexible connecting portion.

13. The portable electronic device of claim 12, wherein the housing further comprises a recess portion formed nearby the opening.

\* \* \* \* \*